US011089634B2

(12) United States Patent
Tu et al.

(10) Patent No.: US 11,089,634 B2
(45) Date of Patent: Aug. 10, 2021

(54) RANDOM ACCESS METHOD, BASE STATION, AND TERMINAL

(71) Applicant: HUAWEI TECHNOLOGIES CO., LTD., Shenzhen (CN)

(72) Inventors: Jing Tu, Chengdu (CN); Bin Jian, Chengdu (CN); Pengfei Li, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 116 days.

(21) Appl. No.: 16/728,935

(22) Filed: Dec. 27, 2019

(65) Prior Publication Data
US 2020/0137805 A1 Apr. 30, 2020

Related U.S. Application Data

(63) Continuation of application No. PCT/CN2018/092094, filed on Jun. 21, 2018.

(30) Foreign Application Priority Data

Jun. 30, 2017 (CN) .......................... 201710530615.9

(51) Int. Cl.
H04W 4/00 (2018.01)
H04W 74/08 (2009.01)
(52) U.S. Cl.
CPC .............................. H04W 74/0833 (2013.01)
(58) Field of Classification Search
CPC ............ H04W 74/0833; H04W 74/002; H04L 5/0057
(Continued)

(56) References Cited

U.S. PATENT DOCUMENTS

2010/0150277 A1  6/2010 Kim et al.
2010/0316016 A1 12/2010 Kim et al.
(Continued)

FOREIGN PATENT DOCUMENTS

CN 101841913 A 9/2010
CN 101978762 A 2/2011
(Continued)

OTHER PUBLICATIONS

Ericsson: "4-step random access procedure",3GPP Draft; R1-1711383,Jun. 26, 2017 (Jun. 26, 2017), XP051300572,total 18 pages.
(Continued)

Primary Examiner — Thai D Hoang
(74) Attorney, Agent, or Firm — Stein IP, LLC

(57) ABSTRACT

A random access method, base station, and terminal, where a base station detects a first preamble value, and generates at least two random access response messages based on the first preamble value. At least one random access response message includes a second preamble value, and at least one random access response message includes a third preamble value, where the second preamble value is the same as the first preamble value, and the third preamble value is a preamble value obtained after the base station adds a preset accumulation number to the first preamble value. The base station then sends the at least two random access response messages to a terminal.

10 Claims, 5 Drawing Sheets

(58) Field of Classification Search
USPC .......... 370/329–330, 335–345, 347–348
See application file for complete search history.

(56) References Cited

U.S. PATENT DOCUMENTS

| | | | |
|---|---|---|---|
| 2011/0098043 A1* | 4/2011 | Yu .................. | H04W 68/02 455/435.1 |
| 2012/0250520 A1* | 10/2012 | Chen .................. | H04L 5/001 370/241 |
| 2014/0064228 A1 | 3/2014 | Pasad et al. | |
| 2015/0341878 A1* | 11/2015 | Lee .................. | H04W 72/042 370/329 |
| 2016/0100429 A1 | 4/2016 | Boström et al. | |
| 2016/0165640 A1* | 6/2016 | Yang .................. | H04W 74/08 370/336 |
| 2016/0198497 A1 | 7/2016 | Yu et al. | |
| 2018/0184461 A1* | 6/2018 | Zhang .................. | H04W 72/042 |
| 2018/0270868 A1* | 9/2018 | Ou .................. | H04W 72/042 |

FOREIGN PATENT DOCUMENTS

| | | |
|---|---|---|
| CN | 102291836 A | 12/2011 |
| CN | 102548015 A | 7/2012 |
| CN | 105307284 A | 2/2016 |
| CN | 105828450 A | 8/2016 |
| CN | 106304388 A | 1/2017 |
| WO | 2017039089 A1 | 3/2017 |

OTHER PUBLICATIONS

3GPP TS 36.523-1 V14.1. 0,:"3rd Generation Partnership Project;Technical Specification Group Radio Access Network; Evolved Universal TerristrialRadio Access (E-UTRA) and Evolved PacketCore (EPC) ; User Equipment (UE)conformance specification; Part 1:Protocol conformance specification(Release 14)",Jun. 28, 2017 (Jun. 28, 2017), XP051299067,pp. 608-1312.

Fujitsu,"Discussion on RACH procedure",3GPP TSG RAN WG1 Meeting #88bis R1-1704477,Spokane, USA Apr. 3-7, 2017,total 6 pages.

* cited by examiner

RANDOM ACCESS METHOD, BASE STATION, AND TERMINAL

CROSS-REFERENCE TO RELATED APPLICATIONS

This application is a continuation of International Application No. PCT/CN2018/092094, filed on Jun. 21, 2018, which claims priority to Chinese Patent Application No. 201710530615.9, filed on Jun. 30, 2017. The disclosures of the aforementioned applications are hereby incorporated by reference in their entireties.

TECHNICAL FIELD

Aspects of this application relate to the communications field, and in particular, to a random access method, a base station, and a terminal.

BACKGROUND

In a long term evolution (LTE) network, a process in which a terminal accesses a base station by using a random access channel (RACH) serves as an important part of terminal access, resynchronization, and handover. A basic principle of an RACH access process is as follows: the terminal sends a preamble ID to a base station, the base station detects the preamble ID and a timing advance (TA) value, and the base station sends a random access response (RAR) message to the terminal. If the preamble ID carried in the RAR received by the terminal is consistent with the preamble ID already sent by the terminal, the terminal sends a MSG 3 (message 3) by using an uplink resource in the RAR, indicating that access is successful. If the preamble ID in the RAR received by the terminal is inconsistent with the already sent preamble ID, the terminal does not send a MSG 3, indicating that access has failed. The base station comprises at least one cell which provides communication service to the terminal. A cell corresponds to a carrier and a physical coverage provided by an antenna. How far the coverage the cell can provide is defined as the radius of the cell.

In many scenarios of an actual network, due to complexity of a geographical location and a surrounding environment, a radius of each cell cannot be precisely obtained, and a scenario in which a terminal beyond the radius of the cell accesses the cell probably exists. When the terminal beyond the radius of the cell accesses the cell, a preamble ID detected by a base station may be inconsistent with an preamble ID sent by the terminal. Consequently, RACH access fails, causing unsuccessful access by or an unsuccessful handover of the terminal.

SUMMARY

Embodiments of this application provide a random access method, a base station, and a terminal, to increase a success rate of accessing the base station by the terminal.

A first aspect of the embodiments of this application provides a random access method, applied to a contention-based access process. The method includes the following.

When a terminal performs contention-based access, the terminal selects one preamble value from a plurality of preamble values, and sends the preamble value to a base station. The base station detects a first preamble value when performing periodic service detection. Because the first preamble value is a preamble value sent by a terminal beyond a radius of a cell, the first preamble value detected by the base station may be inconsistent with the preamble value sent by the terminal. The base station generates at least two random access response messages based on the first preamble value, where in the at least two random access response messages, at least one random access response message includes a second preamble value, and at least one random access response message includes a third preamble value. The base station sets the second preamble value to be the same as the detected first preamble value. The base station sets the third preamble value to be a preamble value obtained after the base station adds a preset accumulation number to the first preamble value. For example, the third preamble value is equal to the first preamble value plus the preset accumulation number. The at least two random access response messages each carry instruction information of an uplink resource allocated by the base station to the terminal, where the instruction information is used to instruct the terminal to send an uplink message by using the uplink resource. The base station sends the generated at least two random access response messages to the terminal. In this way, the terminal can successfully access the base station provided that a preamble value that is the same as the preamble value sent by the terminal exists in the plurality of RAR messages, thereby increasing the success rate of accessing the base station by the terminal.

In a possible implementation, before the base station generates the at least two random access response messages based on the first preamble value, the method may further include the following:

The base station first determines whether the detected first preamble value is a preamble value retransmitted by the terminal. If the detected first preamble value is the preamble value retransmitted by the terminal, the base station generates the at least two random access response messages and sends the at least two random access response messages to the terminal; or if the detected first preamble value is not the preamble value retransmitted by the terminal, the base station may not deliver the random access response message to the terminal. Because a preamble value initially transmitted by the terminal may be wrongly transmitted or falsely transmitted, to reduce mistaken access or unauthorized access by the terminal, the base station may not respond to the initially transmitted preamble value.

A second aspect of the embodiments of this application provides a random access method, applied to a contention-based access process. The method includes:

When a terminal needs to access a base station, the terminal, in a contention-based access mode, first randomly selects a first preamble value from a plurality of preamble values, and sends the randomly selected first preamble value to the base station. After receiving the first preamble value, the base station generates a plurality of random access response messages and sends the plurality of random access response messages to the terminal. After receiving the plurality of random access response messages, the terminal parses each random access response message. If a preamble value carried in one of the random access response messages is consistent with the first preamble value sent by the terminal, the terminal determines that the random access response message is a target random access response message, and sends, based on instruction information of an uplink resource in the target random access response message, an uplink message to the base station by using the uplink resource. In this way, the terminal can successfully access the base station provided that a preamble value that is the same as the preamble value sent by the terminal exists in the plurality of RAR messages, thereby increasing the success rate of accessing the base station by the terminal.

In a possible implementation, at least two random access response messages further include different timing advance TA values. The terminal may adjust, based on a TA value in the target random access response message, a time for sending the uplink message, to implement clock synchronization with the base station, and then send the uplink message to the base station by using the uplink resource. In this way, accuracy for the base station to receive the uplink message sent by the terminal is improved.

A third aspect of the embodiments of this application provides a random access method, applied to a non-contention-based access process. The method includes the following.

When a terminal needs to access a base station, the base station, in a non-contention-based access mode, needs to first allocate a preamble value, for example, a second preamble value, to the terminal, and send the preamble value to the terminal. The base station detects a first preamble value when performing periodic service detection. In this way, the base station determines whether the first preamble value is less than the second preamble value. If the first preamble value is less than the second preamble value, it indicates that because the terminal may send the second preamble value beyond a radius of a cell, a deviation occurs during the detection by the base station, so that the detected first preamble value is less than the second preamble value sent by the terminal. In this case, when the base station delivers a random access response message, a preamble value carried in the message needs the second preamble value, instead of the first preamble value detected by the base station. In this way, the terminal can successfully access the base station, thereby increasing the success rate of accessing the base station by the terminal.

In a possible implementation, before the base station generates the random access response message, the method may further include: the base station first determines whether the first preamble value is a preamble value that has not been allocated by the base station. If the first preamble value is the preamble value that has not been allocated by the base station, the base station sends, to the terminal, the second preamble value allocated to the terminal; or if the first preamble value is not the preamble value that has not been allocated by the base station, it indicates that another terminal may normally access the base station. Therefore, the base station needs to deliver, in a conventional manner, the random access response message to the another terminal. In this way, a likelihood of conflict occurring when a plurality of terminals access the base station is reduced.

A fourth aspect of the embodiments of this application provides a base station, applied to a contention-based access process. The base station includes:

a detection unit, configured to detect a first preamble value;

a generation unit, configured to generate at least two random access response messages based on the first preamble value, where in the at least two random access response messages: at least one random access response message includes a second preamble value, and at least one random access response message includes a third preamble value, where the second preamble value is the same as the first preamble value, and the third preamble value is a preamble value obtained after the base station adds a preset accumulation number to the first preamble value; and the at least two random access response messages each carry instruction information of an uplink resource allocated by the base station to a terminal; and a sending unit, configured to send the at least two random access response messages to the terminal.

A fifth aspect of this application provides a terminal, applied to a contention-based access process. The terminal includes:

a sending unit, configured to send a first preamble value to a base station;

a receiving unit, configured to receive at least two random access response messages from the base station, where the at least two random access response messages each include a different preamble value, and the at least two random access response messages each carry instruction information of an uplink resource allocated by the base station to the terminal; and a determining unit, configured to determine a target random access response message, where a preamble value included in the target random access response message is the same as the first preamble value; and the sending unit is further configured to send, by using the uplink resource, an uplink message to the base station.

A sixth aspect of this application provides a base station, applied to a non-contention-based access process. The base station includes:

a detection unit, configured to detect a first preamble value;

a generation unit, configured to: if the first preamble value is less than a second preamble value, generate a random access response message, where the random access response message includes a third preamble value, the third preamble value is the same as the second preamble value, and the second preamble value is a preamble value allocated by the base station to a terminal; and the random access response message carries instruction information of an uplink resource allocated by the base station to the terminal; and a sending unit, configured to send the random access response message to the terminal.

A seventh aspect of the embodiments of this application provides a base station. The base station includes: a processor, a memory, and a transceiver, where the processor, the memory, and the transceiver are connected by using a bus, the memory stores a computer instruction, and the processor executes the computer instruction to implement the random access method provided in the first aspect or the third aspect.

An eighth aspect of the embodiments of this application provides a terminal. The terminal includes: a processor, a memory, and a transceiver, where the processor, the memory, and the transceiver are connected by using a bus, the memory stores a computer instruction, and the processor executes the computer instruction to implement the random access method provided in the second aspect.

A ninth aspect of the embodiments of this application provides a storage medium. The storage medium stores a computer instruction used to implement the random access method according to any implementation of the first aspect, the second aspect, or the third aspect.

A tenth aspect of the embodiments of this application provides a computer program product. The computer program product includes a computer software instruction, where the computer software instruction may be loaded by a processor to implement a procedure in the random access method according to any implementation of the first aspect, the second aspect, or the third aspect.

An eleventh aspect of the embodiments of this application provides a chip system. The chip system includes a processor, configured to support a base station or a terminal in implementing a function provided in the foregoing aspects, for example, generating or processing information in the foregoing methods. In a possible design, the chip system further includes a memory. The memory is configured to store a program instruction and data that are necessary for supporting the base station or the terminal. The chip system may include a chip, or may include a chip and another discrete component.

It can be learned from the foregoing technical solutions that, the embodiments of this application have the following advantages:

After detecting the first preamble value, the base station generates the plurality of random access response RAR messages, where the plurality of RAR messages include the RAR message that includes the second preamble value the same as the first preamble value, and also include the RAR message that includes the third preamble value different from the first preamble value, where the third preamble value is obtained by accumulating the first preamble value. The base station sends the plurality of generated RAR messages to the terminal. In this way, the terminal can successfully access the base station provided that the preamble value that is the same as the preamble value sent by the terminal exists in the plurality of RAR messages, thereby increasing the success rate of accessing the base station by the terminal.

DESCRIPTION OF EMBODIMENTS

Embodiments of this application provide a random access method, a base station, and a terminal, to increase a success rate of accessing the base station by the terminal.

Figure 1:
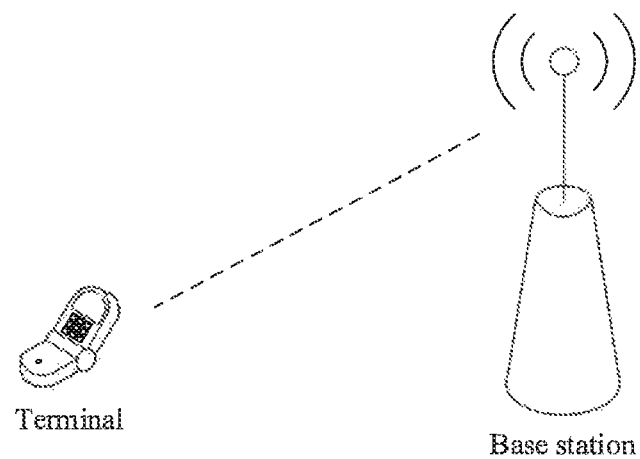
FIG. 1 is a schematic diagram of a system architecture to which a random access method is applied according to an embodiment of this application.

FIG. 1 is a schematic diagram of a system architecture to which a random access method is applied according to an embodiment of this application. The architecture includes a base station and a terminal, and a non-synchronized access mode is used in an uplink random access process in an LTE system. To be specific, when the terminal has not obtained uplink time synchronization or is out of synchronization, the process that is used by the base station to estimate and adjust an uplink transmit clock of the terminal is also used by the terminal to request the base station to allocate a resource. The base station responds to a non-synchronized random access attempt of the terminal, sends time information to the terminal to adjust uplink transmit timing, and allocates an uplink resource for transmitted data or control signaling. In addition, the time information and the allocated uplink resource may also be combined together and then sent to user equipment (UE). The random access process has two modes: One mode is contention-based random access; and the other mode is non-contention-based random access. The base station comprises at least one cell which provides communication service to the terminal. A cell corresponds to a carrier and a physical coverage provided by an antenna. How far the coverage the cell can provide is defined as the radius of the cell. In the LTE system, each cell has 64 available preamble sequences, and the preamble sequences are also referred to as preamble IDs. For a contention-based random access process, the terminal randomly selects one preamble sequence to initiate a random access process to a network side. Therefore, if a plurality of terminals use a same preamble sequence to initiate the random access process at a same moment, a conflict occurs, and an access failure may be caused. For the non-contention-based random access, a preamble sequence allocated by the base station is used to initiate a random access process, and therefore an access success rate is relatively high. However, considering that the base station can know in advance, only in a handover scenario or in a scenario in which downlink data is sent, that the terminal needs to initiate the random access process, the non-contention-based random access may be used only in the two scenarios, and the contention-based random access is used in another application scenario. A preamble value in this application is a preamble ID.

Figure 2:
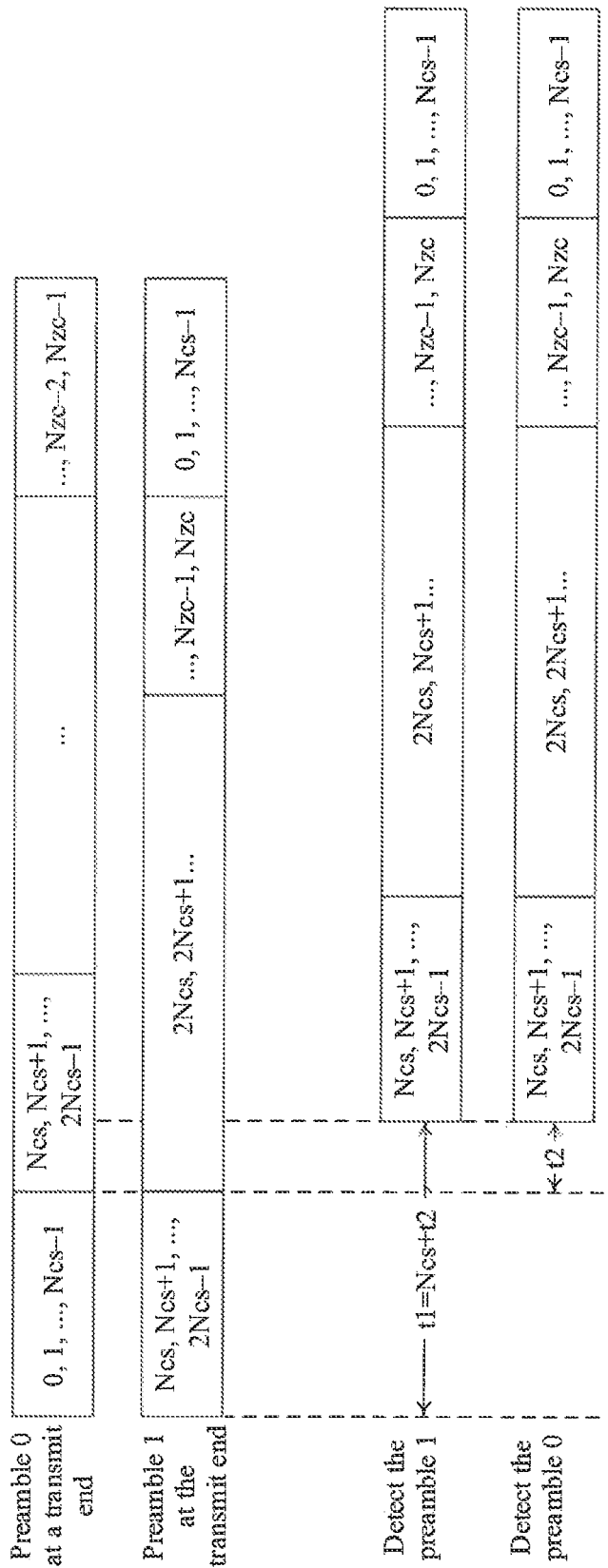
FIG. 2 is a schematic diagram of detecting, by a base station, a preamble ID when a terminal beyond a radius of a cell accesses the base station according to an embodiment of this application.

The serving cell is the cell providing the communication service to the terminal. The base station comprising the serving cell can send a signal to the terminal or receive the signal from the terminal. When a terminal beyond a radius of a serving cell accesses the base station, a preamble ID detected by the base station may be inconsistent with a preamble ID sent by the terminal. Consequently, an RACH access failure occurs. As shown in FIG. 2, when the terminal beyond the radius of the serving cell sends a preamble 1, during detection, the base station considers only a detection result within an Ncs (Ncscyclic) interval, that is, if a preamble 0 is detected, a TA value is t2 (actually, the detected preamble 0 is the preamble 1, and the TA is Ncs+t2). If the base station directly sends the detected preamble 0 to the terminal for verifying the terminal, definitely, the terminal cannot be verified successfully. Therefore, in this embodiment of this application, the base station not only sends the detected preamble ID to the terminal, but also generates a corrected preamble ID, and sends the corrected preamble ID to the terminal, to increase the success rate of accessing the base station by the terminal.

Figure 3:
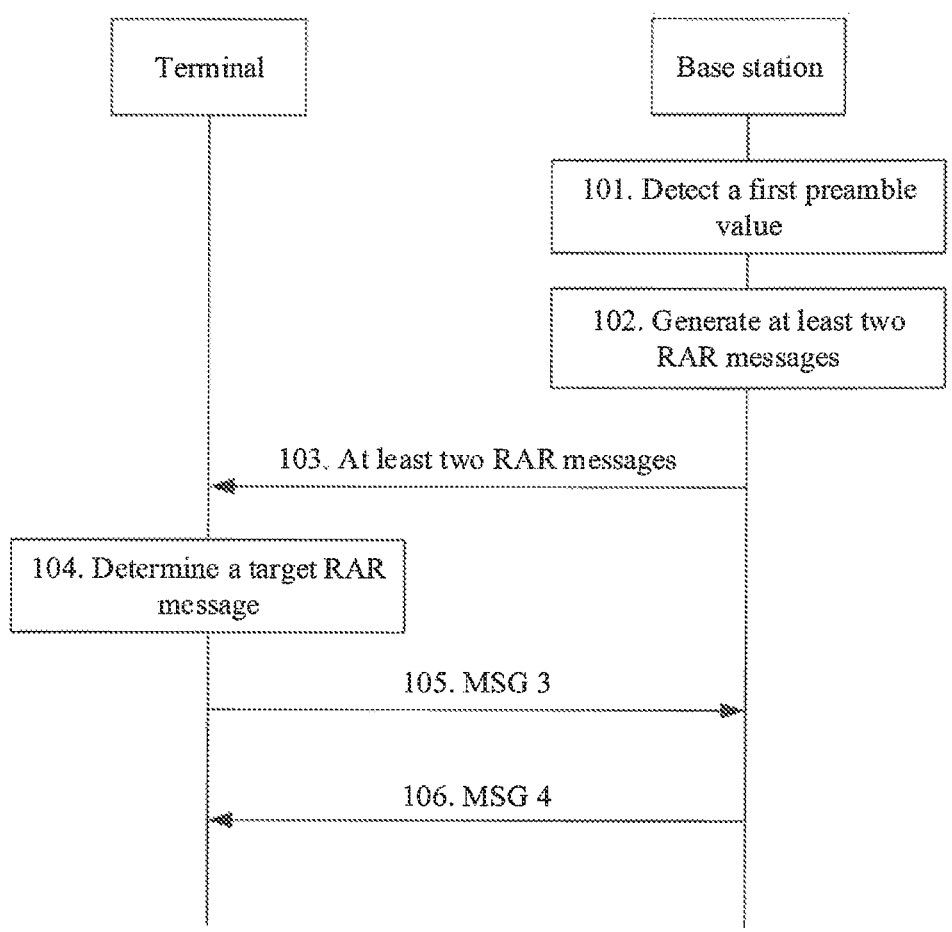
FIG. 3 is a schematic diagram of an embodiment of a random access method according to an embodiment of this application.

FIG. 3 is a schematic diagram of an embodiment of a random access method that is based on a contention-based access process according to an embodiment of this application. The method includes the following steps.

101. A base station detects a first preamble value.

The first preamble value is a preamble ID detected when the base station performs periodic service detection. A terminal randomly selects one preamble ID from a plurality of preamble sequences, and sends the preamble ID to the base station on an RACH channel. The base station detects the preamble ID within a cyclic shift (Ncscyclic, Ncs)

interval, and correlates the preamble ID with all preamble IDs. If a maximum peak can be obtained within the Ncs interval, the detected preamble ID is determined as a valid preamble ID, and a corresponding TA value is determined. Because the preamble ID may be a preamble ID sent beyond a radius of the serving cell, the preamble ID detected by the base station may be different from the preamble ID sent by the terminal. For example, the preamble ID detected by the base station is less than the preamble ID sent by the terminal. For example, the preamble ID sent by the terminal is 2, and the preamble ID detected by the base station is 1.

102. The base station generates at least two random access response RAR messages based on the first preamble value.

In the at least two random access response messages: at least one random access response preamble includes a second preamble value and at least one random access response preamble includes a third preamble value. The second preamble value is the same as the first preamble value, and the third preamble value is a preamble value obtained after the base station adds a preset accumulation number to the first preamble value; and the at least two random access response messages each carry instruction information of an uplink resource allocated by the base station to the terminal.

In this case, the base station cannot know whether the detected preamble ID is consistent with the preamble ID sent by the terminal. To increase a success rate of accessing the base station by the terminal, the base station generates a plurality of RAR messages. A preamble ID in some RAR messages is consistent with the preamble ID detected by the base station, and a preamble ID in some RAR messages is a preamble ID obtained after accumulating the preamble ID detected by the base station. For example, if the preamble ID detected by the base station is 1, the base station generates two RAR messages, a preamble ID carried in one RAR message thereof is 1, and a preamble ID carried in the other RAR message thereof is 2.

The preset accumulation number is a preamble correction amount preset by the base station. For example, the preset accumulation number may be 1 or 2. The base station may generate a plurality of preamble IDs based on the detected preamble ID and the preset accumulation number. For example, if the preamble ID detected by the base station is 1, and the preset accumulation number is 1, the base station may generate a preamble ID that is 2. Alternatively, the base station then changes the preset accumulation number to 2, and continues to generate a preamble ID that is 3. The rest may be deduced by analogy.

In addition, the first random access response message further includes a first timing advance TA value and the second random access message further includes a second TA value. The first TA value corresponds to the second preamble value, the second TA value corresponds to the third preamble value, and the second TA value is related to the preset accumulation number and a first cyclic shift Ncs. The first Ncs is an Ncs used by the base station to detect the first preamble value.

The first TA value is a TA value obtained by the base station by detecting the first preamble value, and the second TA value is a TA value calculated by the base station. Specifically, the second TA value may be calculated by using the first TA value, the first Ncs, and the preset accumulation number. A larger preset accumulation number indicates a larger calculated second TA value. The second TA value is a sum of the first TA and a time offset, and the time offset may be obtained by multiplying the first Ncs by the preset accumulation number used by the base station. If the preset accumulation number used by the base station is 1, it indicates that the base station guesses that the offset may be one Ncs area. If the preset accumulation number is 2, it indicates that the base station guesses that the offset may be two Ncs areas. A manner for calculating the second TA value may be: second. TA=first TA+n*TANcs, where TANcs=Ncs*($2457\!6/\!839$)/16, and n is the preset accumulation number.

Optionally, before the base station generates the at least two random access response messages based on the first preamble value, the method further includes: determining, by the base station, the detected first preamble value as a preamble value retransmitted by the terminal.

Because a preamble ID that is initially transmitted by the terminal and that is detected by the base station may be a preamble ID wrongly transmitted or falsely transmitted by the terminal, the base station may not respond to the preamble ID initially transmitted by the terminal. For the preamble ID retransmitted by the terminal, it indicates that the terminal actually needs to access the base station. Therefore, the base station generates a corresponding RAR message for the terminal. There are a plurality of manners in which the base station determines whether the detected preamble ID is initially transmitted or is retransmitted by the terminal. This is not limited in this application. For example, the base station determines whether the preamble ID is detected previously. If the base station determines that the preamble ID is not detected previously, it indicates that the preamble ID is the preamble ID initially transmitted by the terminal; or if the base station determines that the preamble ID is detected previously, it indicates that the preamble ID is the preamble ID retransmitted by the terminal.

103. The base station sends the at least two random access response messages to the terminal. Correspondingly, the terminal receives the at least two random access response messages from the base station.

After generating the plurality of RAR messages, the base station delivers the plurality of RAR messages to the terminal by using the RACH channel.

104. The terminal determines a target random access response message, where a preamble value included in the target random access response message is the same as the preamble value sent by the terminal.

After receiving the plurality of RAR messages, the terminal parses each RAR message, and if a preamble ID carried in an RAR message is consistent with the preamble ID sent by the terminal, determines the RAR message as the target RAR message.

105. The terminal sends an uplink message to the base station by using the uplink resource.

Optionally, the terminal adjusts an uplink sending time based on a TA value in the target random access response message, and sends, based on the adjusted sending time, the uplink message to the base station by using the uplink resource. The uplink message may be a MSG 3. The terminal may obtain uplink synchronization based on the TA value in the target RAR message, and transmit the MSG 3 on the uplink resource allocated by the base station to the terminal, to perform subsequent data transmission.

106. The base station sends a downlink message to the terminal.

The downlink message may be a MSG 4 (message 4), and the base station and the terminal finally complete contention-based access by using the MSG 4.

In this embodiment of this application, after detecting the first preamble value, the base station generates the plurality of random access response RAR messages. The plurality of RAR messages include an RAR message that includes the second preamble value the same as the first preamble value, and also include an RAR message that includes the third preamble value different from the first preamble value. The third preamble value is obtained by accumulating the first preamble value. The base station sends the plurality of generated RAR messages to the terminal. In this way, the terminal can successfully access the base station provided that a preamble value that is the same as the preamble value sent by the terminal exists in the plurality of RAR messages, thereby increasing the success rate of accessing the base station by the terminal.

Figure 4:
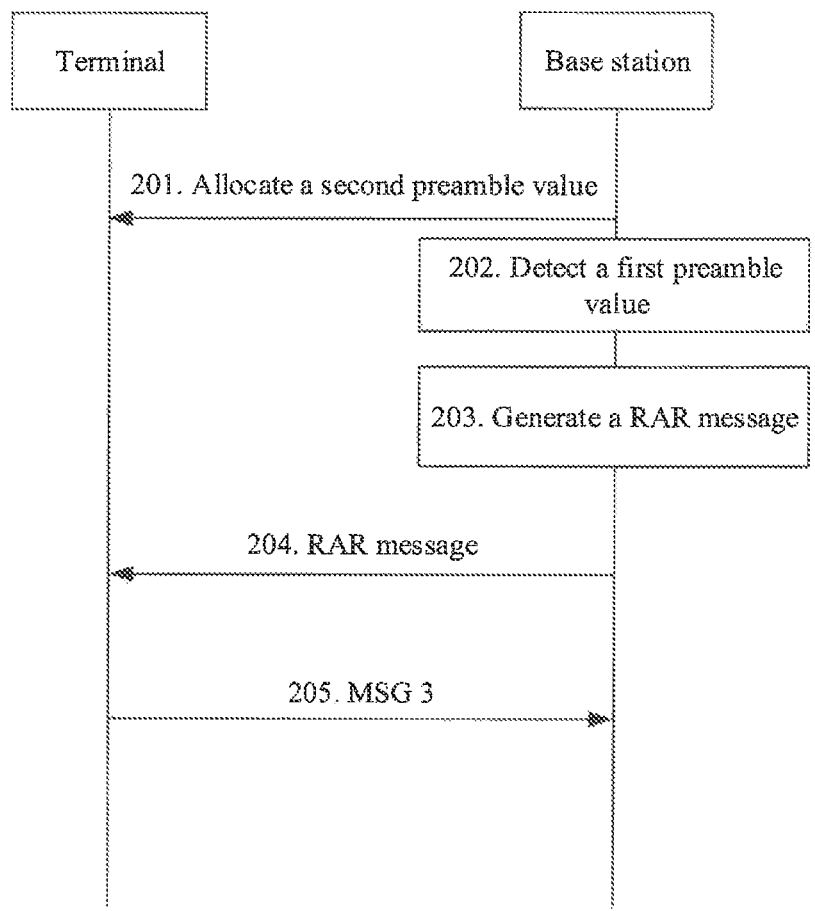
FIG. 4 is a schematic diagram of another embodiment of a random access method according to an embodiment of this application.

FIG. 4 is a schematic diagram of an embodiment of a random access method that is based on a non-contention-based access process according to an embodiment of this application. The method includes the following steps.

201. A base station sends an allocated second preamble value to a terminal.

The second preamble value is a preamble ID allocated by the base station to the terminal. For the non-contention-based access process, the base station needs to first allocate the preamble ID to the terminal. For example, the base station randomly selects one preamble ID from a plurality of preamble IDs, and sends the preamble ID to the terminal. After receiving the preamble ID allocated by the base station, the terminal can access the base station in a non-contention-based access mode without randomly selecting one preamble ID to access the base station in a contention-based access mode. Specifically, the terminal performs non-contention-based access by sending, to the base station, the preamble ID allocated by the base station.

202. The base station detects a first preamble value.

The serving cell is the cell providing the communication service to the terminal. The base station comprising the serving cell can send a signal to the terminal or receive the signal from the terminal. After the base station sends the allocated preamble ID to the terminal, the terminal sends the received preamble ID to the base station by using an RACH channel. The base station detects the preamble ID sent by the terminal. Because the terminal may be a preamble ID sent beyond a radius of the serving cell, the preamble ID detected by the base station may be different from the preamble ID sent by the terminal. For example, the preamble ID detected by the base station is less than the preamble ID sent by the terminal. For example, the preamble ID sent by the terminal is 2, and the preamble ID detected by the base station is 1.

203. If the first preamble value is less than the second preamble value, the base station generates a random access response RAR message.

The random access response message includes a third preamble value. The third preamble value is the same as the second preamble value, and the second preamble value is the preamble value allocated by the base station to the terminal; and the random access response message carries instruction information of an uplink resource allocated by the base station to the terminal.

If the preamble ID detected by the base station is less than the preamble ID allocated by the base station, a preamble ID carried in the RAR message generated by the base station may be the preamble ID allocated by the base station.

The random access response message further includes a timing advance TA value. The TA value is related to a first difference and a first cyclic shift Ncs, the first Ncs is an Ncs used by the base station to receive the first preamble value, and the first difference is a difference between the second preamble value and the first preamble value. Refer to the descriptions in the embodiment of FIG. 3, and details are not further described herein. The random access response message further carries a TA value corresponding to each preamble ID, so that after determining the preamble ID that is consistent with the preamble ID sent by the terminal, the terminal may adjust, based on the TA value corresponding to the preamble ID, a time for sending an uplink message, to implement clock synchronization with the base station. In this way, the base station can relatively accurately receive the uplink message sent by the terminal.

Optionally, the base station may alternatively generate a plurality of RAR messages. A preamble ID carried in some RAR messages is consistent with the preamble ID detected by the base station, and a preamble ID carried in some RAR messages is consistent with the preamble ID allocated by the base station. For details, refer to the descriptions in the embodiment of FIG. 3, and details are not further described herein.

Optionally, before the base station generates the random access response message, the method further includes:

determining, by the base station, the first preamble value as a preamble value that has not been allocated by the base station.

Because the preamble ID detected by the base station may be a preamble ID sent by another terminal, to avoid a conflict, the base station may further determine whether the detected preamble ID is the preamble ID allocated by the base station. If the detected preamble ID is not the preamble ID allocated by the base station, a step of generating the RAR message for the terminal is performed; or if the detected preamble ID is the preamble ID allocated by the base station, the RAR message is generated for another terminal. In this way, a case in which a plurality of terminals use a same preamble ID in the non-contention-based access process is reduced, so that a conflict occurring when the terminals access the base station is reduced, and a success rate of accessing the base station by the terminals is improved.

204. The base station sends the random access response message to the terminal.

Optionally, if the base station generates the plurality of RAR messages, the base station sends all of the plurality of RAR messages to the terminal, so that the terminal determines a target RAR message. For details, refer to the descriptions in the embodiment of FIG. 3, and details are not further described herein.

205. The terminal sends, based on the random access response message, the uplink message to the base station.

Refer to the descriptions in the embodiment of FIG. 3, and details are not further described herein.

Figure 5:
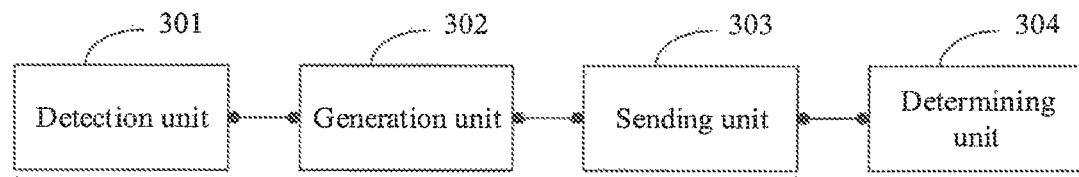
FIG. 5 is a schematic diagram of an embodiment of a base station according to an embodiment of this application.

Referring to FIG. 5, a base station shown in FIG. 5 is applied to a contention-based access process. An embodiment of the base station according to an embodiment of this application includes:

a detection unit 301, configured to detect a first preamble value;

a generation unit 302, configured to generate at least two random access response messages based on the first preamble value, where in the at least two random access response messages: at least one random access response message includes a second preamble value, and at least one random access response message includes a third preamble value, where the second preamble value is the same as the first preamble value, and the third preamble value is a preamble value obtained after the base station adds a preset accumulation number to the first preamble value; and the at least two random access response messages each carry instruction information of an uplink resource allocated by the base station to a terminal; and a sending unit 303, configured to send the at least two random access response messages to the terminal.

Optionally, the base station further includes:

a determining unit 304, configured to: before the generation unit 302 generates the at least two random access response messages based on the first preamble value, determine that the detected first preamble value is a preamble value retransmitted by the terminal.

Optionally, the first random access response message further includes a first timing advance TA value and the second random access response message further includes a second TA value. The first TA value corresponds to the second preamble value, the second TA value corresponds to the third preamble value, and the second TA value is related to the preset accumulation number and a first cyclic shift Ncs. The first Ncs is an Ncs used by the detection unit 301 to detect the first preamble value.

For specific descriptions of functions of the units in the embodiment in FIG. 5, refer to content of the descriptions of the random access method in the embodiment in FIG. 3. Details are not further described herein.

Figure 6:
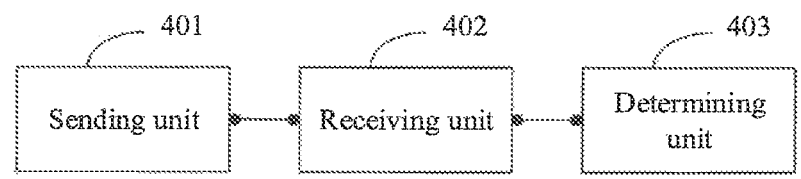
FIG. 6 is a schematic diagram of an embodiment of a terminal according to an embodiment of this application.

Referring to FIG. 6, a terminal shown in FIG. 6 is applied to a contention-based access process. An embodiment of the terminal according to an embodiment of this application includes:

a sending unit 401, configured to send a first preamble value to a base station;

a receiving unit 402, configured to receive at least two random access response messages from the base station, where the at least two random access response messages each include a different preamble value, and the at least two random access response messages each carry instruction information of an uplink resource allocated by the base station to the terminal; and a determining unit 403, configured to determine a target random access response message, where a preamble value included in the target random access response message is the same as the first preamble value; and the sending unit 401 is further configured to send an uplink message to the base station by using the uplink resource.

Optionally, the at least two random access response messages further each include a different timing advance TA value; and the sending unit 401 is specifically configured to:

send, based on a TA value in the target random access response message, the uplink message to the base station by using the uplink resource.

For specific descriptions of functions of the units in the embodiment of FIG. 6, refer to content of the descriptions of the random access method in the embodiment of FIG. 3. Details are not further described herein.

Figure 7:
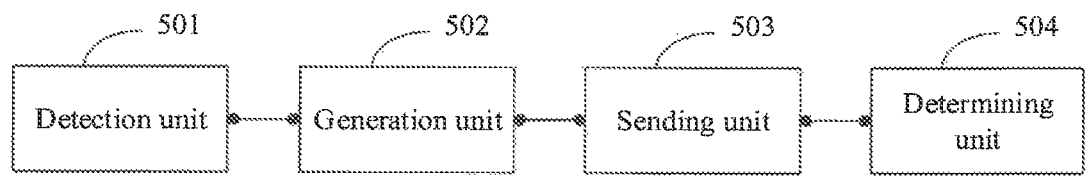
FIG. 7 is a schematic diagram of another embodiment of a base station according to an embodiment of this application.

Referring to FIG. 7, a base station shown in FIG. 7 is applied to a non-contention-based access process. Another embodiment of the base station according to an embodiment of this application includes:

a detection unit 501, configured to detect a first preamble value;

a generation unit 502, configured to: if the first preamble value is less than a second preamble value, generate a random access response message, where the random access response message includes a third preamble value, the third preamble value is the same as the second preamble value, and the second preamble value is a preamble value allocated by the base station to a terminal; and the random access response message carries instruction information of an uplink resource allocated by the base station to the terminal; and a sending unit 503, configured to send the random access response message to the terminal.

Optionally, the base station further includes:

a determining unit 504, configured to: before the generation unit 502 generates the random access response message, determine that the first preamble value is a preamble value that has not been allocated by the base station.

Optionally, the random access response message further includes a timing advance TA value. The TA value is related to a first difference and a first cyclic shift Ncs, the first Ncs is an Ncs used by a receiving unit to receive the first preamble value, and the first difference is a difference between the second preamble value and the first preamble value.

For specific descriptions of functions of the units in the embodiment of FIG. 7, refer to content of the descriptions of the random access method in the embodiment of FIG. 4. Details are not further described herein.

Figure 8:
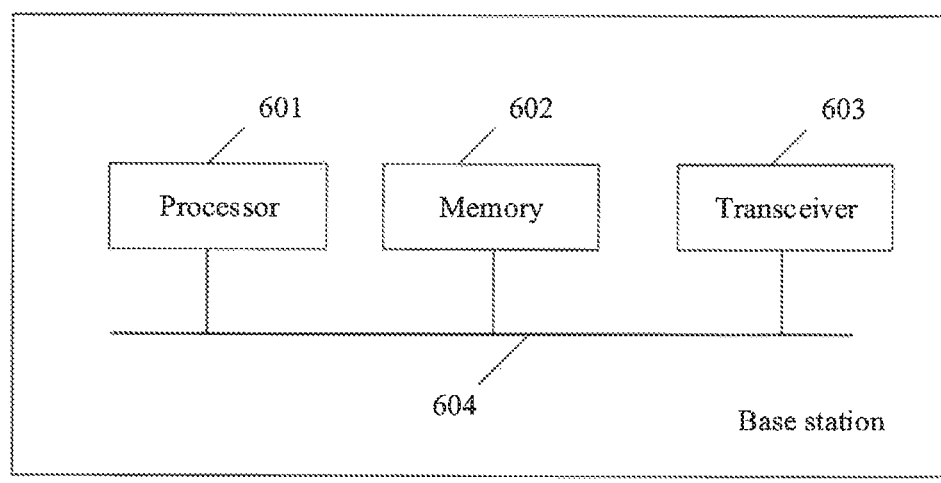
FIG. 8 is a schematic diagram of another embodiment of a base station according to an embodiment of this application.

The base station described in the embodiments of FIG. 5 and FIG. 7 further has another form of embodiment. Referring to FIG. 8, the base station includes: a processor 601, a memory 602, and a transceiver 603. The processor 601, the memory 602, and the transceiver 603 are connected by using a bus 604, the transceiver 603 may include a transmitter and a receiver, the memory 602 stores a computer instruction, and the processor 601 executes the computer instruction to implement the functions of the base station in the random access method according to the embodiment of FIG. 3 or FIG. 4. Various flexible design manners may be used during specific implementation. For corresponding functions of parts, further refer to the method embodiments. This is not limited in the present invention.

Figure 9:
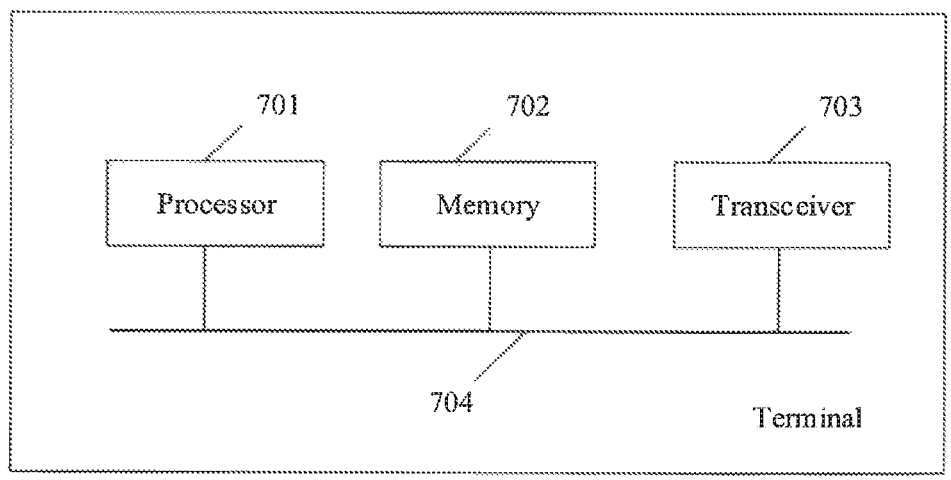
FIG. 9 is a schematic diagram of another embodiment of a terminal according to an embodiment of this application.

The terminal described in the embodiment of FIG. 6 further has another form of embodiment. Referring to FIG. 9, the terminal includes: a processor 701, a memory 702, and a transceiver 703. The processor 701, the memory 702, and the transceiver 703 are connected by using a bus 704, the transceiver 703 may include a transmitter and a receiver, the memory 702 stores a computer instruction, and the processor 701 executes the computer instruction to implement functions of the terminal in the random access method according to the embodiment of FIG. 3. Various flexible design manners may be used during specific implementation. For functions of parts, further refer to the method embodiments. This is not limited in the present invention.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of the present invention are all or partially generated. The computer may be a general-purpose computer, a dedicated-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the Objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in at computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A random access method, applied to a contention-based access process, comprising:
    detecting, by a base station, a first preamble value;
    generating, by the base station based on the first preamble value, at least two random access response messages, wherein the at least two random access response messages comprise a first random access response message and a second random access response message, the first random access response message comprises a second preamble value, and the second random access response message comprises a third preamble value, wherein the second preamble value is the same as the first preamble value, and the third preamble value is a preamble value obtained after the base station adds a preset accumulation number to the first preamble value; and the at least two random access response messages each carry instruction information of an uplink resource allocated by the base station to a terminal; and
    sending, by the base station, the at least two random access response messages to the terminal.

2. The method according to claim 1, wherein before the generating, by the base station based on the first preamble value, at least two random access response messages, the method further comprises:
    determining, by the base station, the detected first preamble value as a preamble value retransmitted by the terminal.

3. The method according to claim 1, wherein the first random access response message further comprises a first timing advance (TA) value and the second random access response message further comprises a second TA value, wherein the first TA value corresponds to the second preamble value, the second TA value corresponds to the third preamble value, and the second TA value is related to the preset accumulation number and a first cyclic shift Ncs, wherein the first Ncs is an Ncs used by the base station to detect the first preamble value.

4. A base station comprising:
    a processor; and
    a non-transitory computer readable medium storing a program to be executed by the processor, the program comprises instructions for:
    detecting a first preamble value;
    generating at least two random access response messages based on the first preamble value, wherein the at least two random access response messages comprise a first random access response message and a second random access response message, the first random access response message comprises a second preamble value, and the second random access response message comprises a third preamble value, wherein the second preamble value is the same as the first preamble value, and the third preamble value is a preamble value obtained after the base station adds a preset accumulation number to the first preamble value; and the at least two random access response messages each carry instruction information of an uplink resource allocated by the base station to a terminal; and
    sending the at least two random access response messages to the terminal.

5. The base station according to claim 4, wherein the program further comprises instructions for
    before generating the at least two random access response messages based on the first preamble value, determining that the detected first preamble value is a preamble value retransmitted by the terminal.

6. The base station according to claim 4, wherein the first random access response message further comprises a first timing advance (TA) value and the second random access message further comprises a second TA value, wherein the first TA value corresponds to the second preamble value, the second TA value corresponds to the third preamble value, and the second TA value is related to the preset accumulation number and a first cyclic shift Ncs, wherein the first Ncs is an Ncs used by the detection unit to detect the first preamble value.

7. A terminal comprising:
   a processor; and
   a non-transitory computer readable medium storing a program to be executed by the processor, the program comprises instructions for:
   sending a first preamble value to a base station;
   receiving at least two random access response messages from the base station, wherein the at least two random access response messages each comprise a different preamble value, and the at least two random access response messages each carry instruction information of an uplink resource allocated by the base station to the terminal; and
   determining a target random access response message, wherein a preamble value comprised in the target random access response message is the same as the first preamble value.

8. The terminal according to claim 7, wherein the at least two random access response messages further each comprise a different timing advance (TA) value; and
   the program further comprises instructions for:
   sending, based on a TA value in the target random access response message, an uplink message to the base station by using the uplink resource.

9. The method according to claim 1, wherein the base station comprises a serving cell configured to send a signal to the terminal or receive the signal from the terminal, the method further comprising:
   when the terminal is beyond a radius of the serving cell and accesses the base station, considering, by the base station, a detected preamble ID within an Ncs (Ncscyclic) interval, generating, by the base station, a corrected preamble ID, and sending, by the base station, the detected preamble ID and the corrected preamble ID to the terminal.

10. The base station according to claim 5, wherein the base station comprises a serving cell configured to send a signal to the terminal or receive the signal from the terminal, wherein when the terminal is beyond a radius of the serving cell and accesses the base station, the base station considers a detected preamble ID within an Ncs (Ncscyclic) interval, generates a corrected preamble ID, and sends the detected preamble ID and the corrected preamble ID to the terminal.

* * * * *